United States Patent Office 2,873,818
Patented Feb. 17, 1959

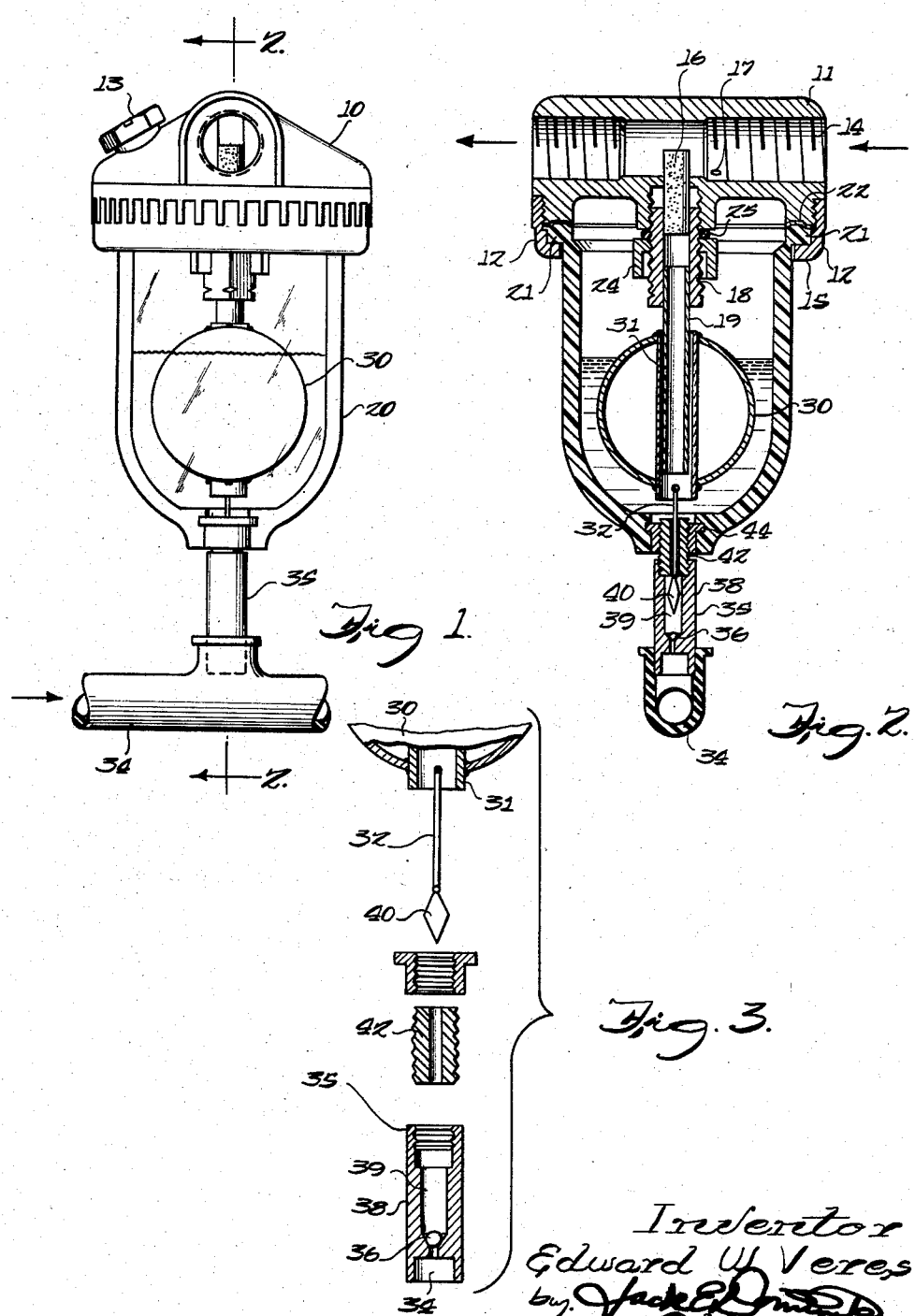

2,873,818

AIR LINE LUBRICATOR

Edward W. Veres, Chicago, Ill., assignor to Arrow Tools, Inc.

Application December 3, 1954, Serial No. 472,823

9 Claims. (Cl. 184—55)

The present invention relates to pressure fluid reservoirs for pneumatic tools, mist coolant systems, atomizers and the like, and particularly to an automatic reservoir filler for use with air line lubricators. The invention finds particular, although not necessarily exclusive, utility where a plurality of such air line lubricators are employed.

Air line lubricators employ a wide variety of devices to feed oil into an air line from a reservoir bowl. Such bowls may carry an oil supply sufficient for a normal day's operation. Should the reservoir capacity be enlarged, the utility of the lubricator is often diminished by the increased bulk. Consequently, the individual lubricators must be refilled at intervals based on their use. This, of course, entails checking the oil level periodically to determine whether enough oil is available to do the job, and refilling where necessary. Where a large number of lubricators are employed in a single factory, often it is a full-time job for one or several men to check the lubricators and refill them when necessary.

With the foregoing in mind, the present invention has as its general object furnishing a pressure fluid reservoir with an automatic feed thereby assuring a properly filled supply of oil.

A further object of the invention is to provide an automatic filler unit which may be readily installed on existing lubricators and other pressure reservoirs.

Still another object of the invention is to provide air line lubricators with a means for maintaining a constant level of lubricating fluid within its reservoir. A corollary object is to supply lubrication fluid to the feeder of an air line lubricator at a constant rate.

Further objects and advantages of the invention will become evident as the following description proceeds, taken together with the accompanying illustrative drawings in which:

Figure 1 is a side elevation view of an air line lubricator illustrating one embodiment of the present invention.

Figure 2 is a sectional view of Figure 1 taken along section 2—2.

Figure 3 is an exploded view of the automatic oil levelling mechanism shown in an enlarged scale.

The present invention may be employed in air line lubricators where the lubricating fluid is stored in a reservoir. It is particularly adaptable to that type of air line lubricator disclosed in United States Patent No. 2,680,496, although it may be readily adapted by known expedients to many other pressure reservoirs.

It will be seen from a review of the drawings showing an exemplary embodiment of the invention, that the air line lubricator for which the exemplary automatic feed is intended contemplates three basic elements: the air line connector, a lubricating fluid reservoir, and a conduit which feeds the lubricating fluid into the air line. The automatic lubricating feed assembly functions through the cooperation of a unique float and check valve unit coupled in series with a source of lubricating fluid under pressure.

In operation, oil may be initially placed in the reservoir through a filler cap, but it will subsequently be fed through the oil line supply. By providing a float within the reservoir, a check valve is actuated when the float lowers to allow fluid under pressure to enter the reservoir. Subsequently the check valve is actuated by the float to close the valve, when a proper fluid level has been reached in the reservoir. A second check valve has been provided to prevent fluid backing up from the reservoir into the line if the fluid pressure should drop considerably.

Because pressure from the fluid supply line is constantly exerted on the float valve, fluid will not enter the reservoir until the weight of the float is sufficient to overcome the upward pressure load on the float valve. This effect minimizes hunting in the operation of the system. As a consequence, there is a range between capacity and the refill point in which the filling mechanism is inoperative.

Although the embodiment of the invention shown for illustrative purposes appears in an air line lubricator, other applications of the invention are numerous. For example, the refilling mechanism may be employed in the reservoir for a mist coolant system, paint spray guns, evaporators and the like.

In the embodiment shown, the automatic feed assembly utilizes existing elements of an air line lubricator to implement its operation. In detail, the components of the embodiment illustrated will be best understood by referring to the drawings. In Fig. 1 the lubricator is shown as having a housing 10 and reservoir bowl 20. The housing 10, as will be seen in Fig. 2, comprises a cap 11 and a ring 12, threaded to be coupled to each other. The cap 11 is provided with an air passage 14 and threaded at its ends to accommodate the air line fittings. The lower ring 12 is threaded to the cap 11 and is provided with a flanged lower portion 15 which engages the reservoir bowl 20 at its upper shoulder 21. A rubber washer or other suitable gasket 22 provides a seal between the cap 11 and ring 12 so that they function as a unit.

The air line lubricators such as the one illustrated, are normally intended for use along pneumatic air lines which supply air under pressure to pneumatic tools. The purpose of the lubricator is to furnish a predetermined amount of oil vapor in the air line which will assist in lubricating the tool. In the present instance the lubricant is picked up by the air passing through the cap 11 as it wipes oil from the sintered metal wick 16. The sintered metal wick is held in the upper housing by means of any convenient fastening; in the present instance, a threaded sleeve 18.

The oil or other fluid from the reservoir reaches the sintered metal wick 16 through a tube 19 which extends downward from the threaded sleeve 18. An adjusting collar 24 is threaded to the outer portion of the wick sleeve 18, and provides a means for variably adjusting the extent to which the sintered metal wick 16 extends into the air passage in the cap 11. A washer 25 seals and fixes the position of the collar 24 on the sleeve 18 thereby positioning the wick 16 in the air stream.

The automatic feed mechanism utilizes the air line lubricator construction described above. The existing units are usually manually fed with a supply of oil through means such as a filler cap 13 in the cap 11.

The unique automatic filling mechanism relies for its intelligence on a float 30 which rides in the fluid in the reservoir 20. A hollow core in the float 30 is provided by means of its center being formed of a tube 31. The diameter of the tube 31 is slightly larger than the tube 19 through which the fluid passes upwardly to the wick 16. The upward and downward movement of the float 30 is guided by the coaction of the fluid tube and cylindrical core of the float 30.

The sensing of the fluid level by the float 30 is transmitted to a valving mechanism 35 by means of a float link 32. It will be appreciated that fluid is constantly being supplied under pressure from a remote reservoir (not shown) through the line 34. This fluid passes up through a back-out check valve 36 in the base 38 of the check valve mechanism 35. Once the oil is in the check valve reservoir 39, the back-out check valve 36 prevents it from reentering the oil line 34.

The back-out check valve 36 is a free-floating sphere; that is, it is free to float within the check valve reservoir 39. The bottom of the check valve reservoir is conical in shape, thereby guiding the check valve 36 into a seated position if the fluid flow should tend to reverse.

The oil will move from the check valve reservoir 39 upward into the main oil reservoir 20 only when permitted by the teardrop-shaped inlet valve 40. As will be seen from Figs. 2 and 3, the teardrop 40 is attached to the float by means of float link 32, and seats against the base of the bore of a threaded sleeve 42. The sleeve 42 threads into bushing 44 which is cast in the base of the transparent reservoir 20.

In operation, the air passes through the air passage 14 in the upper housing 11 and by the wick 16. This air is under varying pressures, but commonly at 90 to 100 p. s. i. The pressure of the air is transmitted through a bleeder hole 17 into the air space above the oil in the reservoir 20. Because a constricted area in the air passage 14 has been formed adjacent the wick 16, a venturi effect is created and a pressure differential set up between the air in the reservoir and the air adjacent the wick. This differential causes the oil to rise through the oil tube 19 and through the sintered metal wick 16 from which it is wiped by the air passing through the air passage 14.

Fluid is supplied under pressure through the conduit 34 under varying pressures to the fluid reservoir, but generally within the range of five (5) to thirty-five (35) p. s. i. greater than its associated pneumatic pressure.

It will be appreciated that when the air pressure exceeds the fluid pressure, the tendency would be for the fluid to back out through the check valve mechanism. This is prevented, however, by the back-out check valve 36. Since the tools used on the air lines are used intermittently, and since the pressures will vary considerably, there will be periods when the fluid level will tend to lower in the reservoir 20. At this time the weight of the float 30 is transmitted to the inlet valve 40 through the float link 32. The inlet valve 40 is opened when the weight of the float exceeds the pressure loading on the base of the valve caused by the fluid in the reservoir 39. Fluid then enters the reservoir until the float becomes sufficiently buoyant to raise and seat the inlet valve 40.

By providing a more constant level of oil, the action of the lubricator in delivering oil to the wick 16 is more uniform, and constant performance of the lubricator is improved. In addition, the function of inspecting a plurality of reservoirs and refilling on a daily basis may be rendered automatic by employing such an automatic filler, and extensive cost savings enjoyed by the user.

Although one particular embodiment of the invention has been shown and described in full here, there is no intention to thereby limit the invention to the details of such embodiment. On the contrary, the intention is to cover all modifications, alternative embodiments, usages and equivalents of the pressure fluid reservoir as fall within the spirit and scope of the invention, specification and appended claims.

I claim as my invention:

1. A pressure fluid regulator for use with a reservoir holding liquid and a gas under pressure comprising, in combination, a generally vertical conduit serving to introduce liquid under pressure into the reservoir, a back-out check valve coupled in series with the conduit and serving to prevent such liquid in the reservoir from backing out to the source of such liquid, a float having a hollow vertical bore within the reservoir, a vertical member engaging the vertical bore in the fluid and serving to guide the float for vertical movement enforced thereon by variations in the level of such liquid within said reservoir, an inlet check valve coupled in series with the conduit to control the flow of liquid into said reservoir, and a vertical link coaxial with the vertical float guide connecting the float with the inlet check valve and being dimensionally proportioned to transmit a predetermined rise in the float to a closing of the inlet check thereby maintaining the liquid in the reservoir at a predetermined level.

2. An automatic fluid regulator of the character defined in claim 1 in which the inlet check valve upper portion is conically shaped with the vertex of the cone pointing toward the reservoir.

3. An automatic fluid regulator of the character defined in claim 1 in which the back-out check valve is a sphere.

4. An automatically filled lubricator for a pneumatic air line comprising, in combination, an air passageway, means for feeding a lubricant into the passageway, a reservoir for lubricating fluid, vertical tubular means communicating with said reservoir and feeding means for conveying lubricant from the reservoir to the feeding means, a connector coupled to the reservoir, means for connecting a source of pressure lubricating fluid under pressure to the connector for supplying said reservoir therewith, a float having a hollow central portion adapted to slide vertically on said tubular means, a link attached to the float and extending downwardly therefrom, said connector defining a link guide passage therein receiving said link for vertical movement relative thereto, a valve at the lower end of the link, and a seat provided by said connector above the valve for engagement therewith to control the flow of lubricating fluid through said connector to said reservoir.

5. An automatically filled lubricator for a pneumatic air line comprising, in combination, an air passageway, means for feeding a lubricant into the passageway, a reservoir for lubricating fluid, vertical tubular means communicating with said reservoir and feeding means for conveying lubricant from the reservoir to the feeding means, a connector coupled to the reservoir, means for connecting a source of pressure lubricating fluid under pressure to the connector for supplying said reservoir therewith, a float having a hollow central portion adapted to slide vertically on said tubular means, a link attached to the float and extending downwardly therefrom, said connector defining a link guide passage therein receiving said link for vertical movement relative thereto, a valve at the lower end of the link, and a seat provided by said connector above the valve for engagement therewith to control the flow of lubricating fluid through said connector to said reservoir, said connector being equipped with a back-up check valve and seat therefor below the link valve to prevent the flow of lubricating fluid through said connector from said reservoir.

6. An automatically filled lubricator for a pneumatic air line comprising, in combination, an air passageway, means for feeding lubricant into the passageway, a reservoir, a tube extending vertically into the reservoir for feeding lubricant to the feeder means, a float having a hollow central portion to slidingly engage the tube, a link extending downwardly from the float, a combination valve seat and link guide having a hollow central bore through which the link is inserted, a valve at the end of the link proportioned to engage the valve seat link guide lower portion, and pressure conduit means for delivering lubricant under pressure to the combination valve guide and seat and thereafter into the reservoir responsive to variations in the float level.

7. In combination with a device providing both a flow passage for gas under pressure and a liquid-receiving reservoir communicating with said flow passage whereby a gaseous fluid under pressure is normally present in said reservoir, a coupling defining a flow conduit therethrough and being connected with said reservoir for supplying liquid thereto when connected to a pressurized source of such liquid, a valve seat provided by said coupling along said conduit, a valve disposed on the inlet side of said seat so as to be biased theretoward by the pressure of such liquid acting thereagainst, a float within said reservoir and being equipped with a link extending therefrom into said conduit and to said valve for displacing the same from said seat when the liquid within said reservoir recedes below a predetermined level, and means for constraining said float for movement thereof along an axis substantially coincident with the longitudinal axis of said conduit, said means comprising guide means rigidly related with said device and comprising also wall portions provided by said float for cooperative interaction therewith.

8. The combination of claim 7 in which said guide means are positioned in axial alignment with the longitudinal axis of said conduit.

9. The combination of claim 7 in which said coupling is equipped with a check valve disposed adjacent the inlet thereof to prevent the flow of liquid through said conduit from said reservoir.

References Cited in the file of this patent

UNITED STATES PATENTS

| | | |
|---|---|---|
| 741,962 | Grouvelle et al. | Oct. 20, 1903 |
| 1,157,588 | Rubesky | Oct. 19, 1915 |
| 1,195,343 | En Earl | Aug. 22, 1916 |
| 1,763,061 | Monier | June 10, 1930 |
| 2,680,496 | Johnson | June 8, 1954 |
| 2,737,933 | Swenson | Mar. 13, 1956 |

FOREIGN PATENTS

| | | |
|---|---|---|
| 169,345 | Great Britain | Sept. 29, 1921 |